(12) United States Patent
Goldschlag et al.

(10) Patent No.: US 10,185,963 B2
(45) Date of Patent: *Jan. 22, 2019

(54) METHOD FOR AUTHENTICATION AND ASSURING COMPLIANCE OF DEVICES ACCESSING EXTERNAL SERVICES

(71) Applicant: Cellsec, Inc., Silver Spring, MD (US)

(72) Inventors: David Goldschlag, Silver Spring, MD (US); Eric Dahl, Annapolis, MD (US)

(73) Assignee: Cellsec, Inc., Silver Spring, MD (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/494,620

(22) Filed: Apr. 24, 2017

(65) Prior Publication Data

US 2018/0005250 A1 Jan. 4, 2018

Related U.S. Application Data

(63) Continuation of application No. 14/679,294, filed on Apr. 6, 2015, now Pat. No. 9,646,309.

(Continued)

(51) Int. Cl.
*H04L 29/06* (2006.01)
*G06Q 30/00* (2012.01)
*G06F 21/57* (2013.01)

(52) U.S. Cl.
CPC ........... *G06Q 30/018* (2013.01); *G06F 21/57* (2013.01); *H04L 63/0272* (2013.01); *H04L 63/0815* (2013.01); *H04L 63/20* (2013.01)

(58) Field of Classification Search
None
See application file for complete search history.

(56) References Cited

U.S. PATENT DOCUMENTS 7,249,187 B2 7/2007 Sobel et al.
7,512,965 B1 * 3/2009 Amdur .................... H04L 63/20
726/1

(Continued)

OTHER PUBLICATIONS

Conti, et al., CRePE: Context-Related Policy Enforcement for Android, Lecture Notes in Computer Science, Oct. 25, 2010, pp. 331-345, vol. 6531, Publisher: Springer, Published in: DE.

(Continued)

*Primary Examiner* — Shin-Hon (Eric) Chen
(74) *Attorney, Agent, or Firm* — Shumaker & Sieffert, P.A.

(57) ABSTRACT

Systems and methods are described for determining whether an electronic computing device complies with the security policy for a network. The invention includes receiving an electronic request signal including an electronically encoded request to allow an electronically encoded process operating on an electronic processor of the electronic computer device to establish electronic communication with a specific target electronic device or service operating on the electronic communications and data network; receiving electronically encoded information about the identity of the electronically encoded process, the electronic computing device, or the use of the electronic computing device; receiving electronically encoded policy elements for the security policy; receiving electronically encoded information about the compliance of the electronic computing device; receiving electronically encoded information related to the identity of the principal of the electronic computing device; and determining whether the electronic computing device complies with the security policy.

72 Claims, 10 Drawing Sheets

Related U.S. Application Data

(60) Provisional application No. 61/975,629, filed on Apr. 4, 2014.

(56) References Cited

U.S. PATENT DOCUMENTS

| | | | |
|---|---|---|---|
| 7,526,792 B2 | 4/2009 | Ross | |
| 7,975,286 B1* | 7/2011 | Fickey | H04L 63/20 |
| | | | 726/1 |
| 8,443,435 B1 | 5/2013 | Schroeder | |
| 8,464,335 B1 | 6/2013 | Sinha et al. | |
| 8,474,037 B2 | 6/2013 | Weiss | |
| 8,499,330 B1* | 7/2013 | Albisu | H04L 63/10 |
| | | | 726/1 |
| 8,650,616 B2 | 2/2014 | Chan et al. | |
| 8,756,651 B2 | 6/2014 | Baer | |
| 8,931,042 B1 | 1/2015 | Weiss et al. | |
| 9,171,172 B2 | 10/2015 | Goldschlag et al. | |
| 9,294,508 B2 | 3/2016 | Goldschlag et al. | |
| 9,646,309 B2 | 5/2017 | Goldschlag et al. | |
| 9,659,169 B2 | 5/2017 | Weiss et al. | |
| 2002/0104015 A1* | 8/2002 | Barzilai | G06F 21/604 |
| | | | 726/1 |
| 2003/0023587 A1 | 1/2003 | Dennis et al. | |
| 2003/0105849 A1 | 6/2003 | Iwamoto et al. | |
| 2005/0257267 A1 | 11/2005 | Williams et al. | |
| 2006/0090196 A1* | 4/2006 | van Bemmel | G06F 21/6218 |
| | | | 726/4 |
| 2007/0101405 A1* | 5/2007 | Engle | H04L 63/0272 |
| | | | 726/4 |
| 2009/0007264 A1* | 1/2009 | Chatterjee | G06F 21/577 |
| | | | 726/22 |
| 2010/0024009 A1* | 1/2010 | Comay | 726/4 |
| 2011/0214176 A1 | 9/2011 | Burch et al. | |
| 2012/0023550 A1* | 1/2012 | Xu | H04L 63/08 |
| | | | 726/3 |
| 2012/0151568 A1 | 6/2012 | Pieczel et al. | |
| 2013/0081101 A1* | 3/2013 | Baer | G06F 21/577 |
| | | | 726/1 |
| 2013/0130653 A1* | 5/2013 | Deasy | H04W 76/10 |
| | | | 455/411 |
| 2013/0133043 A1* | 5/2013 | Barkie | H04L 63/10 |
| | | | 726/4 |
| 2013/0283338 A1* | 10/2013 | Kumar | H04L 63/20 |
| | | | 726/1 |
| 2014/0020073 A1 | 1/2014 | Ronda et al. | |
| 2015/0281276 A1* | 10/2015 | U | H04L 63/20 |
| | | | 726/1 |
| 2017/0026413 A1 | 1/2017 | Goldschlag et al. | |

OTHER PUBLICATIONS

Ongtang, et al., Semantically Rich Application-Centric Security in Android, Security and Communications Networks, Aug. 23, 2011, pp. 658-673, vol. 5, No. 6, Publisher: Wiley.

WIPO, International Search Report for PCT/US15/24474 Publisher: WIPO, Published in: PC.

Prosecution history of U.S. Appl. No. 14/679,294 dated Apr. 12, 2016 through Dec. 28, 2016, 53 pp.

Prosecution history of counterpart EP Application No. 15774227.1 dated Nov. 23, 2016 through Jul. 3, 2018, 83 pp.

International Preliminary Report on Patentabiliy dated Oct. 4, 2016 in counterpart International Application No. PCT/US15/24474, 7 pp.

Written Opinion of the International Searching Authority dated Aug. 4, 2015 in counterpart International Application No. PCT/US15/24474, 6 pp.

U.S. Appl. No. 13/710,261, filed Dec. 10, 2012, Cellsec, Inc. (Inventor: Yoav Weiss), entitled "Method for Authentication and Assuring Compliance of Devices Accessing External Services".

U.S. Appl. No. 61/975,629, filed Apr. 4, 2014, Cellsec, Inc. (Inventor: David Goldschlag), entitled "Method for Authentication and Assuring Compliance of Devices Accessing External Services".

\* cited by examiner

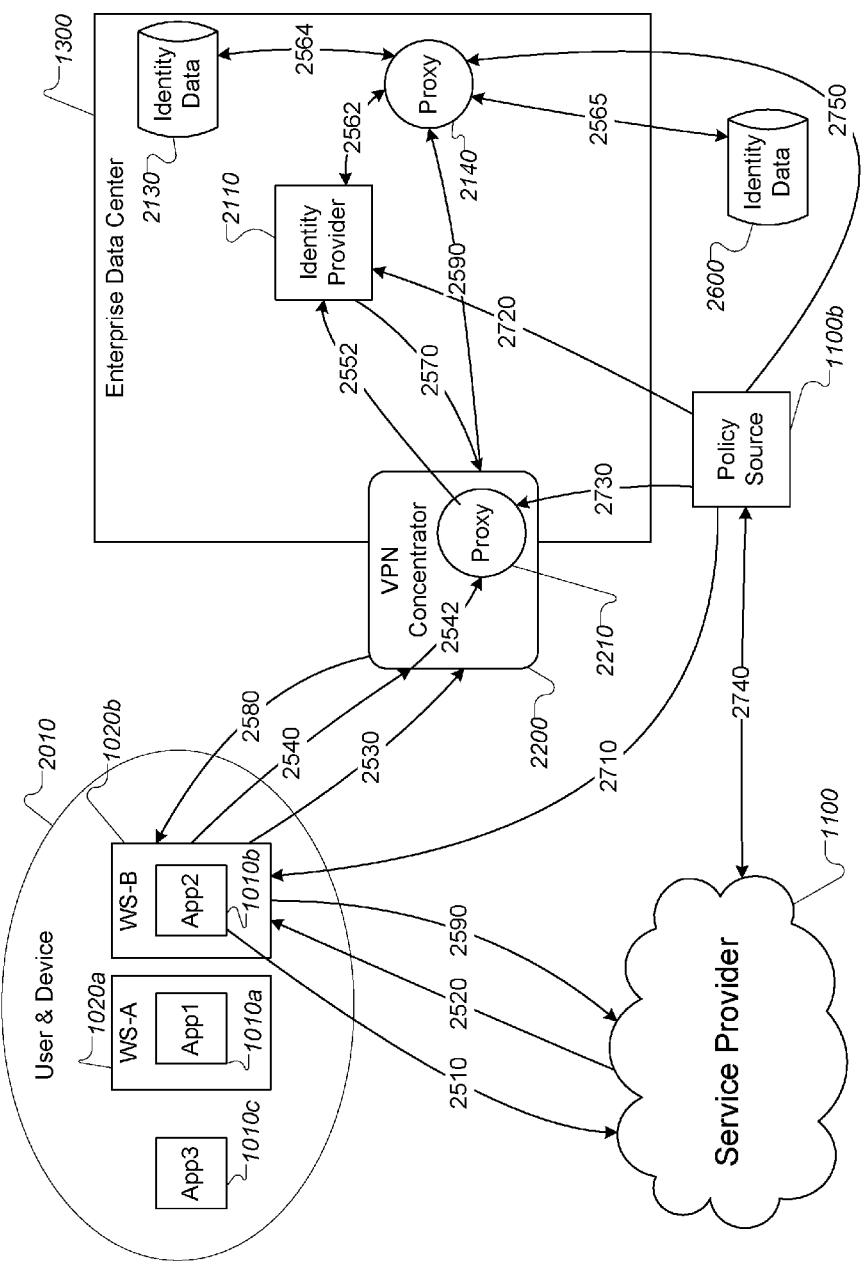

METHOD FOR AUTHENTICATION AND ASSURING COMPLIANCE OF DEVICES ACCESSING EXTERNAL SERVICES

1 CROSS-REFERENCE TO RELATED APPLICATIONS

This application claims priority under 35 U.S.C. § 120 as a continuation of U.S. patent application Ser. No. 14/679,294, filed 6 Apr. 2015, which patent application claims priority under 35 U.S.C. § 119(e) to provisional U.S. patent application Ser. No. 61/975,629 filed 4 Apr. 2014. The entire disclosure of each application is incorporated herein by reference in its entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2014-2015, MobileSpaces, LLC.

3 BACKGROUND OF THE INVENTION

3.1 Field of the Invention

The exemplary, illustrative, technology herein relates to systems, software, and methods for supporting authentication, authorization, and policy compliance assurance of a device accessing various participating network services accessible without using a VPN for a device and user based on the establishment of a VPN tunnel between a device and a VPN concentrator. The technology herein has applications in the areas of network security, single-sign on ("SSO") support for network service access, e-commerce, and enterprise device policy compliance enforcement.

3.2 The Related Art

The Security Assertion Markup Language (SAML) protocol is an XML-based open standard data format for exchanging authentication and authorization data between parties, such as between an identity provider ("IDP") and a service provider. The SAML specification defines three roles: the principal (e.g., a user running an application on a device), the identity provider, and the service provider. Generally, the principal first requests a service from the service provider. The service provider then requests and obtains an assertion from the identity provider, which may request information from the principal, such as a user name and password, in order to authenticate the principal to provide the assertion. On the basis of this assertion, the service provider makes an access control decision (i.e. determines whether or not to perform the requested services for the principal).

SAML specifies the assertions between the three parties: in particular, the messages that assert identity that are passed from the identity provider to the service provider. In SAML, one identity provider may provide SAML assertions to many service providers. Similarly, one service provider may rely on and trust assertions from many identity providers. SAML, however, does not specify the method of authentication to be used by an identity provider; the identity provider may make use of a username and password, or some other form of authentication, such as multi-factor authentication. Directory services, that allow users to gain access with a user name and password, are typical sources of authentication tokens (e.g., passwords).

Thus, SAML authentication does not provide for policy enforcement of enterprise policies at the identity provider or the service provider. There are not effective mechanisms for policy delivery, enforcement, and reporting when using third party identity and service providers.

The present invention meets these and other needs.

4 SUMMARY OF THE INVENTION

In a first aspect, the present invention provides systems for providing a compliance-based identity for determining whether an electronic computing device complies with the security policy for an electronic communications and data network of electronic computer devices, in which the determination includes the context of the electronic computing device. In a first embodiment, the systems comprises an identity provider configured to: receive an electronic request signal, the electronic request signal including an electronically encoded request to allow an electronically encoded process operating on an electronic processor of the electronic computer device to establish electronic communication with a specific target electronic device or service operating on the electronic communications and data network; receive electronically encoded information about the identity of the electronically encoded process, the electronic computing device, or the use of the electronic computing device; receive electronically encoded policy elements for the security policy; receive electronically encoded information about the compliance of the electronic computing device; receive electronically encoded information related to the identity of the principal of the electronic computing device; and determine whether the electronic computing device complies with the security policy using at least one of the received information and policy elements.

In some embodiments, the electronically encoded policy elements are received from a remote electronic policy store containing the electronically encoded policy elements. In other embodiments, the electronically encoded policy elements are included in a look-up in a local electronic data store. In still other embodiments, the electronically encoded policy elements are selected from the group consisting of: specifications related to time of day access, location of access, required user device specifications, forbidden user device specifications, and anti-virus status. In yet other embodiments, the information about the compliance of the electronic computing device is received from the electronic computing device in the electronic request signal. In some embodiments, the information about the compliance of the electronic computing device is received from an compliance server or compliance data store. In some embodiments, the identity provider is further configured to generate at least one electronically encoded indicator. And in some embodiments, at least a portion of the electronically encoded information related to the identity of the principal of the electronic computing device has been validated.

In a second aspect, the present invention provides methods for determining whether an electronic computing device complies with the security policy for an electronic communications and data network of electronic computer devices including the context of the electronic computing device. In a first embodiment, the method comprises receiving an electronic request signal, the electronic request signal including an electronically encoded request to allow an electronically encoded process operating on an electronic processor of the electronic computer device to establish electronic communication with a specific target electronic device or service operating on the electronic communications and data network; receiving electronically encoded information about the identity of the electronically encoded process, the electronic computing device, or the use of the electronic computing device; receiving electronically encoded policy elements for the security policy; receiving electronically encoded information about the compliance of the electronic computing device; receiving electronically encoded information related to the identity of the principal of the electronic computing device; and determining whether the electronic computing device complies with the security policy using at least one of the received information and policy elements.

In some embodiments, the electronically encoded policy elements are received from a remote electronic policy store containing the electronically encoded policy elements. In other embodiments, the electronically encoded policy elements are included in a look-up in a local electronic data store. In still other embodiments, the electronically encoded policy elements are selected from the group consisting of: specifications related to time of day access, location of access, required user device specifications, forbidden user device specifications, and anti-virus status. In yet other embodiments, the information about the compliance of the electronic computing device is received from the electronic computing device in the electronic request signal. In some embodiments, the information about the compliance of the electronic computing device is received from an compliance server or compliance data store. In some embodiments, the identity provider is further configured to generate at least one electronically encoded indicator. And in some embodiments, at least a portion of the electronically encoded information related to the identity of the principal of the electronic computing device has been validated.

In a third aspect, the present invention provides a non-transitory computer-readable medium, containing electronically encoded computer readable program control devices thereon. In a first embodiment, the electronically encoded computer readable program control devices being configured to enable an electronic computer to perform electronic computer operations comprising: receiving an electronic request signal, the electronic request signal including an electronically encoded request to allow an electronically encoded process operating on an electronic processor of the electronic computer device to establish electronic communication with a specific target electronic device or service operating on the electronic communications and data network; receiving electronically encoded information about the identity of the electronically encoded process, the electronic computing device, or the use of the electronic computing device; receiving electronically encoded policy elements for the security policy; receiving electronically encoded information about the compliance of the electronic computing device; receiving electronically encoded information related to the identity of the principal of the electronic computing device; and determining whether the electronic computing device complies with the security policy using at least one of the received information and policy elements.

In some embodiments, the electronically encoded policy elements are received from a remote electronic policy store containing the electronically encoded policy elements. In other embodiments, the electronically encoded policy elements are included in a look-up in a local electronic data store. In still other embodiments, the electronically encoded policy elements are selected from the group consisting of: specifications related to time of day access, location of access, required user device specifications, forbidden user device specifications, and anti-virus status. In yet other embodiments, the information about the compliance of the electronic computing device is received from the electronic computing device in the electronic request signal. In some embodiments, the information about the compliance of the electronic computing device is received from an compliance server or compliance data store. In some embodiments, the identity provider is further configured to generate at least one electronically encoded indicator. And in some embodiments, at least a portion of the electronically encoded information related to the identity of the principal of the electronic computing device has been validated.

These and other aspects and advantages will become apparent when the Description below is read in conjunction with the accompanying Drawings.

5 BRIEF DESCRIPTION OF THE DRAWINGS

The features of the present invention will best be understood from a detailed description of the invention and example embodiments thereof selected for the purposes of illustration and shown in the accompanying drawings in which:

FIG. 2C depicts an exemplary schematic diagram of interactions between objects involved in an authentication interaction with an identity data proxy in accordance with one embodiment of the invention.

Figure 3:
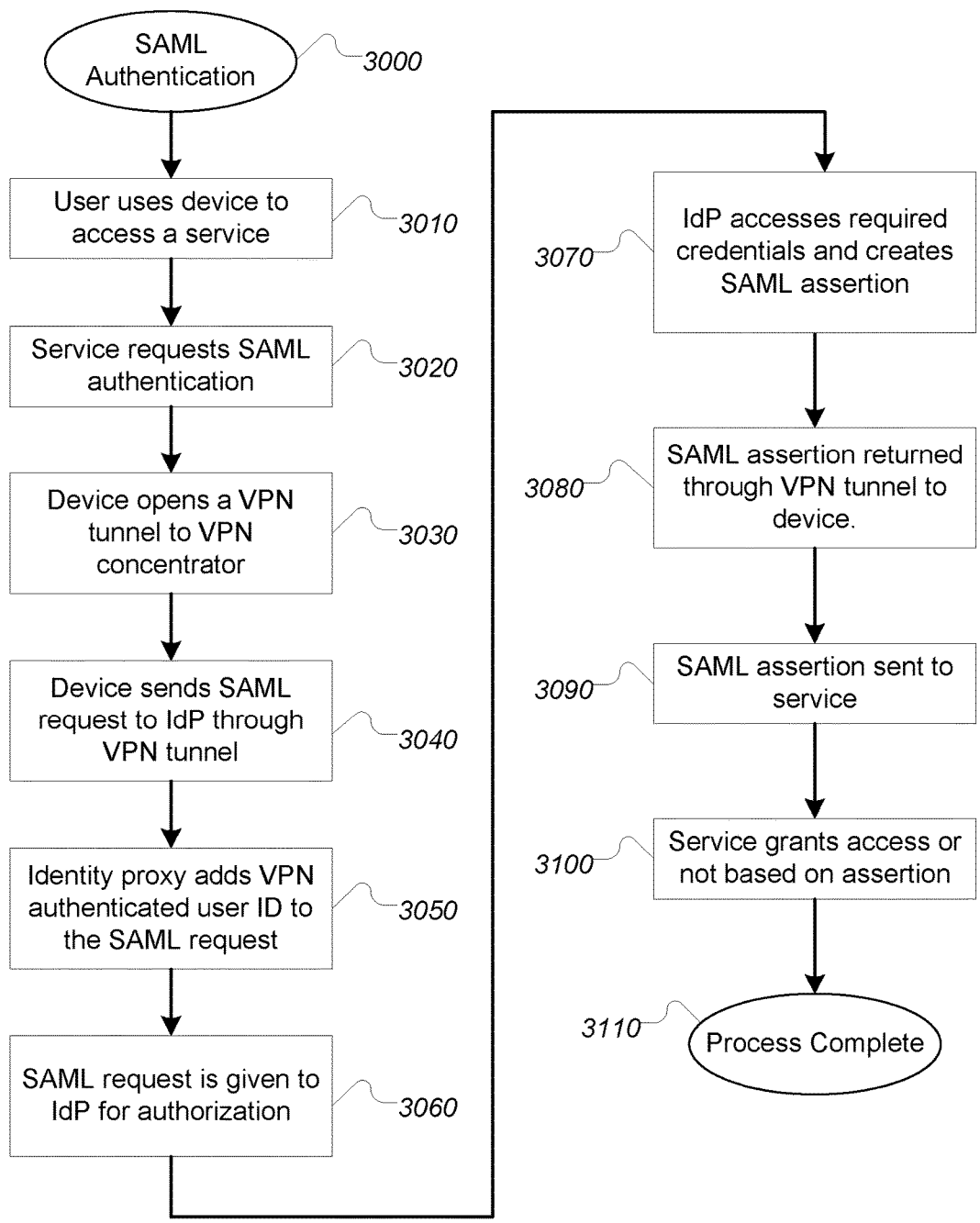

FIG. 3 comprises a process flowchart depicting an example authentication process and policy compliance process in accordance with one embodiment of the invention.

Figure 4:
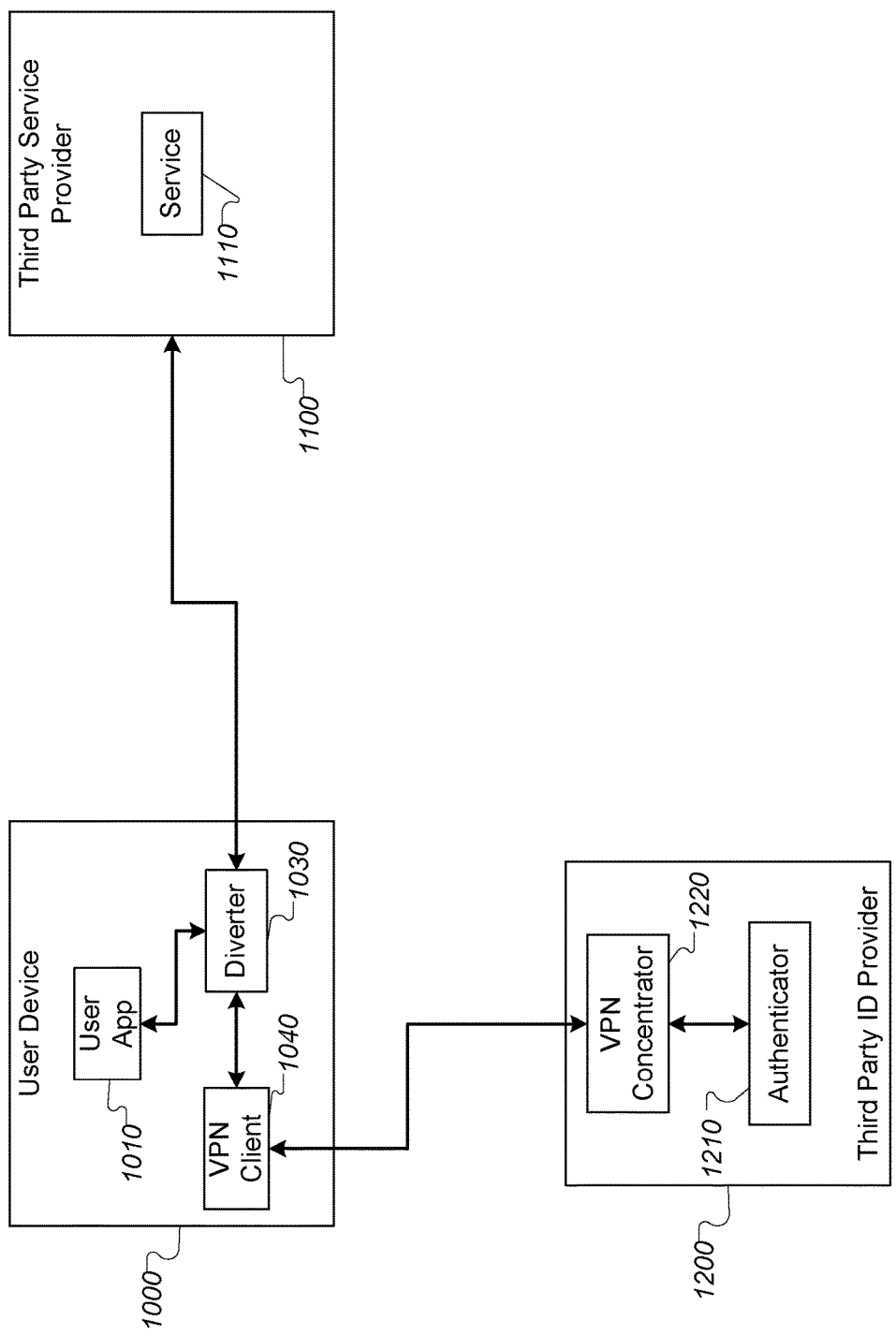

FIG. 4 depicts entities involved in a SAML authentication involving DNS redirection in accordance with one embodiment of the invention.

Figure 5:
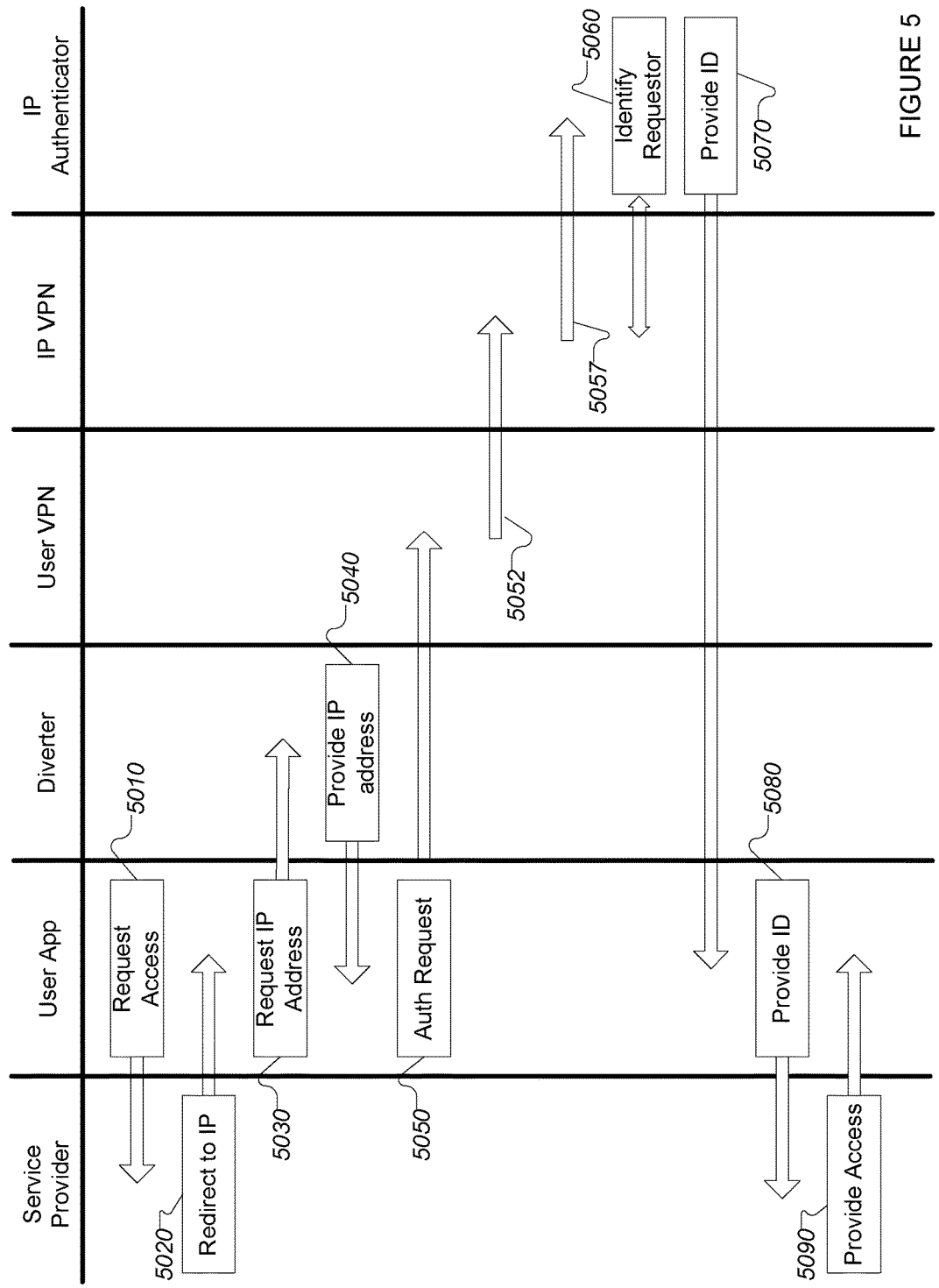

FIG. 5 depicts interactions in a SAML authentication involving DNS redirection in accordance with one embodiment of the invention in accordance with one embodiment of the invention.

Figure 6:
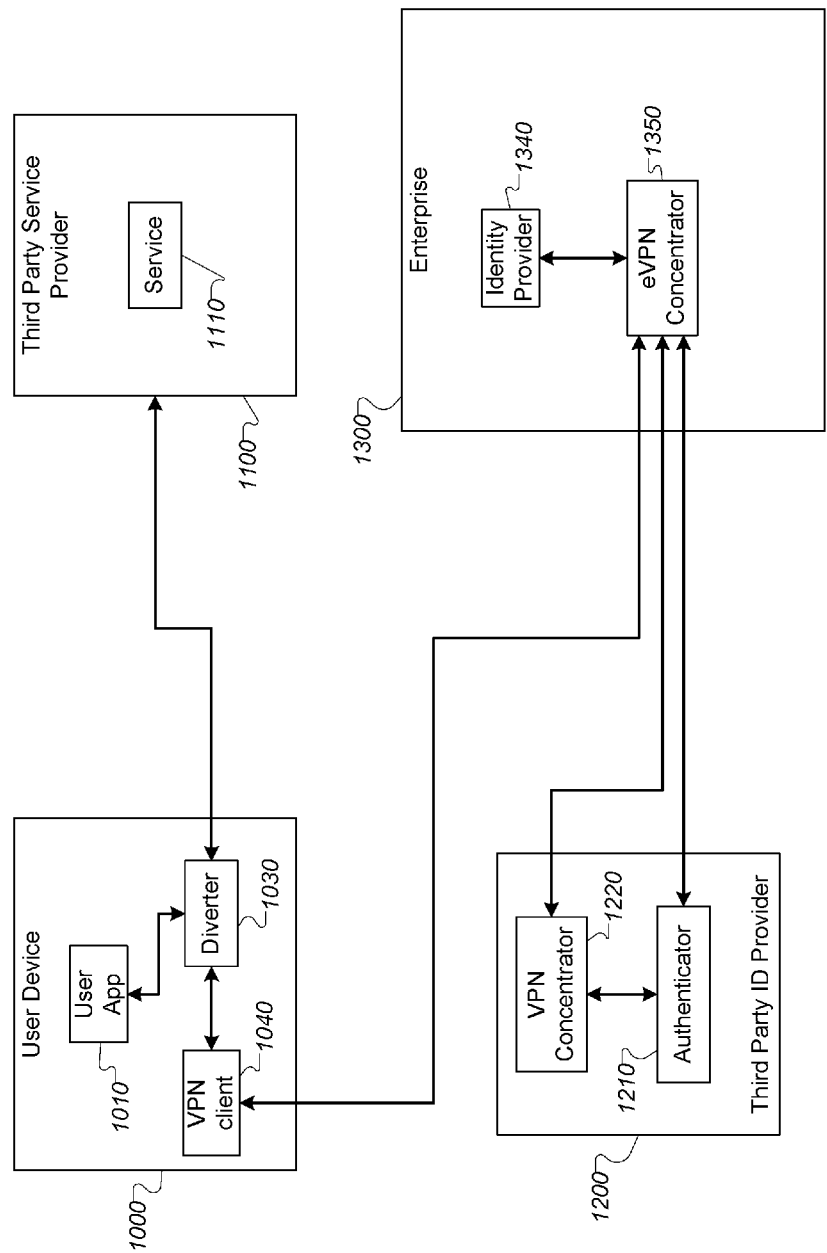

FIG. 6 depicts alternative patterns of interaction between entities in a DNS redirected SAML authentication in accordance with one embodiment of the invention.

Figure 7:
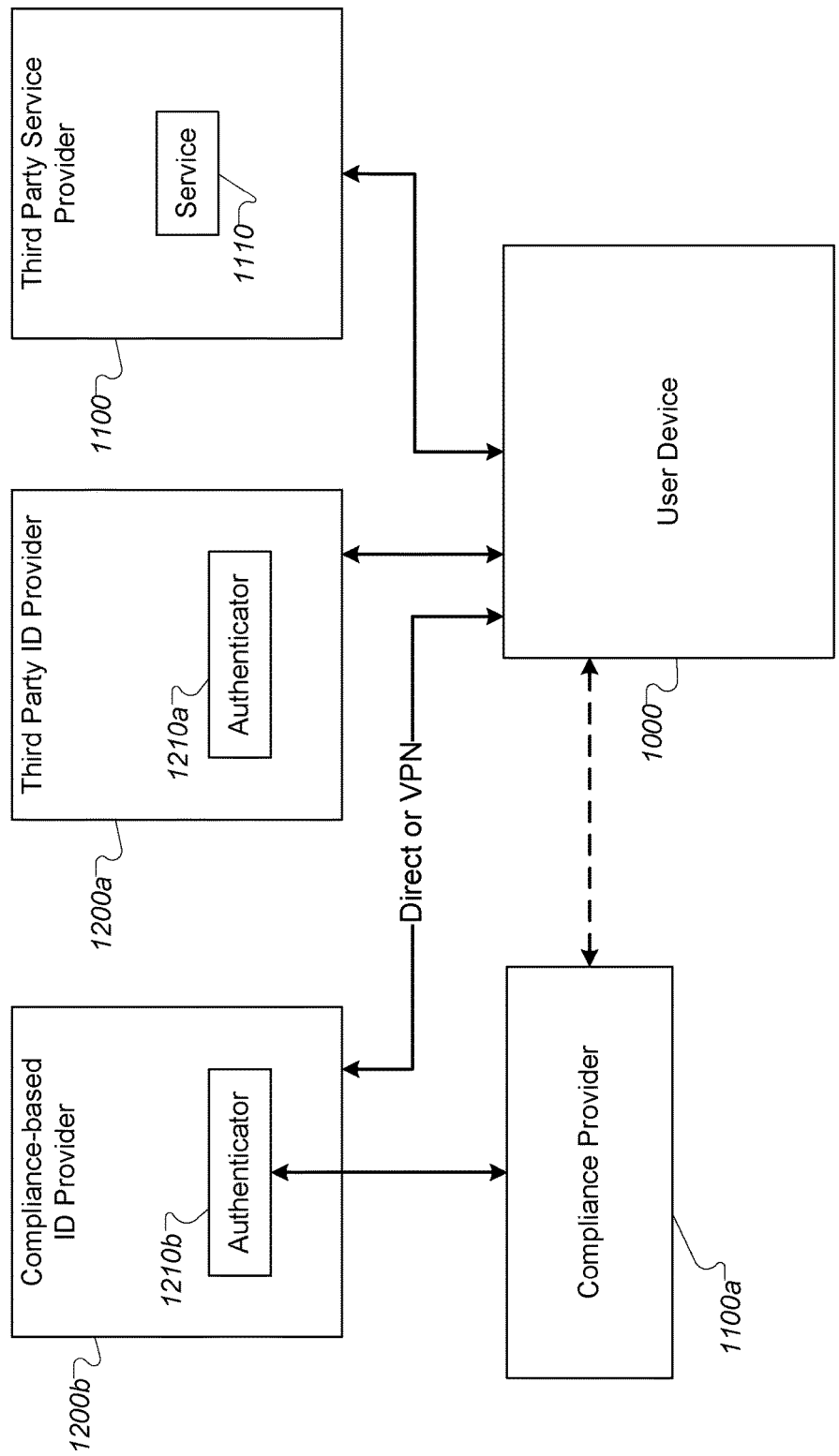

FIG. 7 depicts a cascading identity provider chain including a compliance-aware identity provider in accordance with one embodiment of the invention.

6 DESCRIPTION OF SOME EMBODIMENTS OF THE INVENTION 6.1 Overview

In today's information technology ("IT") infrastructures, computing services used by employees exist in both enterprise data centers, which are typically accessed via virtual private network ("VPN") tunnels, as well external services provided "in the cloud" (e.g., from a commercial internet service provider such as Salesforce). Enterprises need to be confident that only authorized users are accessing the external services, and also that the device endpoints of all connections they use (e.g., PCs, laptops, or mobile devices) are known and are in compliance with required policy specifications. Enterprises would also like to control which applications on the endpoint devices are granted access to a given service.

One challenge when using third party assertions to grant access to a service is that the request for access loses contextual relevance, e.g., the request for access to the service is not correlated with the status of the user device or its compliance with enterprise policies. When controlled or sensitive information (e.g., personally identifiable information) is provided by the third party services to the user device, the contextual status of the user device may provide the difference between an inadvertent or unauthorized disclosure of the controlled or sensitive information.

Thus, there is a need for managing the device context when accessing third party services from user devices. One particular aspect of the device context is information related to where the device has been and what networks it has been connected to. Some enterprises do not permit devices to connect to their networks or services after they have been connected to specific or unauthorized networks, or if the device has been taken to specific parts of the world. For example, an enterprise might refuse to permit a device to connect after it has been taken overseas if their policy is that devices must be scrubbed when returning to the US.

Alternatively, the user device may be granted only limited access (or access to a specific subset of services) if it is not up to date on its compliance requirements, if the device is (or is not) in a specific location, if virus scanning has not been performed within a policy specified time in the past, etc. For example, the device may not be granted access to a service hosting secure documents if it is not in a secure location as determined by the device's GPS and the WiFi networks that are identifiable to the device.

Authentication and compliance checking of devices accessing enterprise resources with an enterprise data center is well understood. As will be understood by those having ordinary skill in the art upon reading the present Description with the accompanying Drawings, the present invention enables the device to have unlimited connectivity, with limits only to its ability to connect or use specific services, at least in part upon the basis of its compliance status.

The challenge is to provide this same level of authentication and compliance checking of endpoint devices (e.g., user devices, sometimes called Bring-Your-Own-Device, "BYOD") whilst accessing external services that are not under the control of the enterprise. One of the challenges of enforcing enterprise policy upon connections between user devices outside the firewall and third party service providers is that the enterprise typically does not intermediate the connection between the user device and the third party service provider, and the third party service provider is often unwilling to actively enforce enterprise policies due to the amount of custom development and integration required. For example, as malware infestation becomes more prevalent, external service accesses must be protected in the same manner as accesses to enterprise-internal services. One example of this type of protection is to ensure that malware operating on a user device does not access external services in order to obtain data or take disruptive actions. Policy enforcement of malware prevention and checking is required, and third party providers are unable to dictate these requirements to user devices.

External services that an enterprise's employee's access may implement include standards-based authentication protocols (e.g., SAML, described above) that provide single-sign on functionality. What is missing from current systems are enterprise policy enforcement and compliance checks of the user device status prior to granting access to the external services.

Policy compliance of user devices connecting to external services is important because it ensures that enterprise policies are complied with prior to the device/user being granted access to the external service (and to the enterprise data it provides). For example, an enterprise policy may specify that to gain access to enterprise information, active malware defenses are operating on the device, and that the device has been recently scanned and determined to be free of malware. Device compliance checking includes not only registration of the device, but also includes periodic and real-time checks of the device's health, configuration, applications present or running on the device, and evidence of tampering (e.g., "rooting" or malware infestation). In some cases, the policy compliance decisions are based on the basis of one or more of the following: the whole device, upon the status of a secured partition or workspace present on the device, or upon the presence or absence of specific configurations, including specific applications or application configurations, or past device activities, such as connection locations. The implementation challenge is that the protocols used to access these third party services use protocols that do not permit the provision of compliance information from the user device. Other techniques are needed to enable compliance and enterprise policy enforcement in these cases.

A first exemplary, illustrative technology described herein is a compliance-based identity service that makes identity decisions and provides identity assertions at least in part based upon policy-based specifications of compliance and accesses permitted for defined compliance states.

A second exemplary, illustrative technology described herein provides a mechanism that allows single sign on ("SSO") from a user-device pair (also referred to herein as a "principal") to any service provider that uses SAML for proof of identity and authorization while enforcing additional policy aspects including device compliance. The mechanism uses the authentication carried out for access to a VPN tunnel to provide authentication information to an Identity Provider, which is then able to produce an identity certification (e.g., produces a SAML assertion) without perform after performing any additional desired authentication or verification steps. This provides several benefits over typical SAML processes: the user only authenticates once (e.g., to the VPN tunnel), the device itself is authenticated by the VPN tunnel (e.g., through a certificate), the source application or workspace also may be validated by the VPN tunnel or by the identity provider, and the device's policy compliance state can be determined and considered when determining whether or how to issue the requested SAML assertion.

The systems and methods described herein permit the seamless integration and interoperability of external and enterprise policy, third party identity and service providers, and device compliance. The methods, devices, and other materials necessary to implement the various embodiments of the invention described herein will be familiar to those having ordinary skill in the art when considered in conjunction with the present Disclosure and Drawings.

6.2 Exemplary System Architecture

Figure 1A:
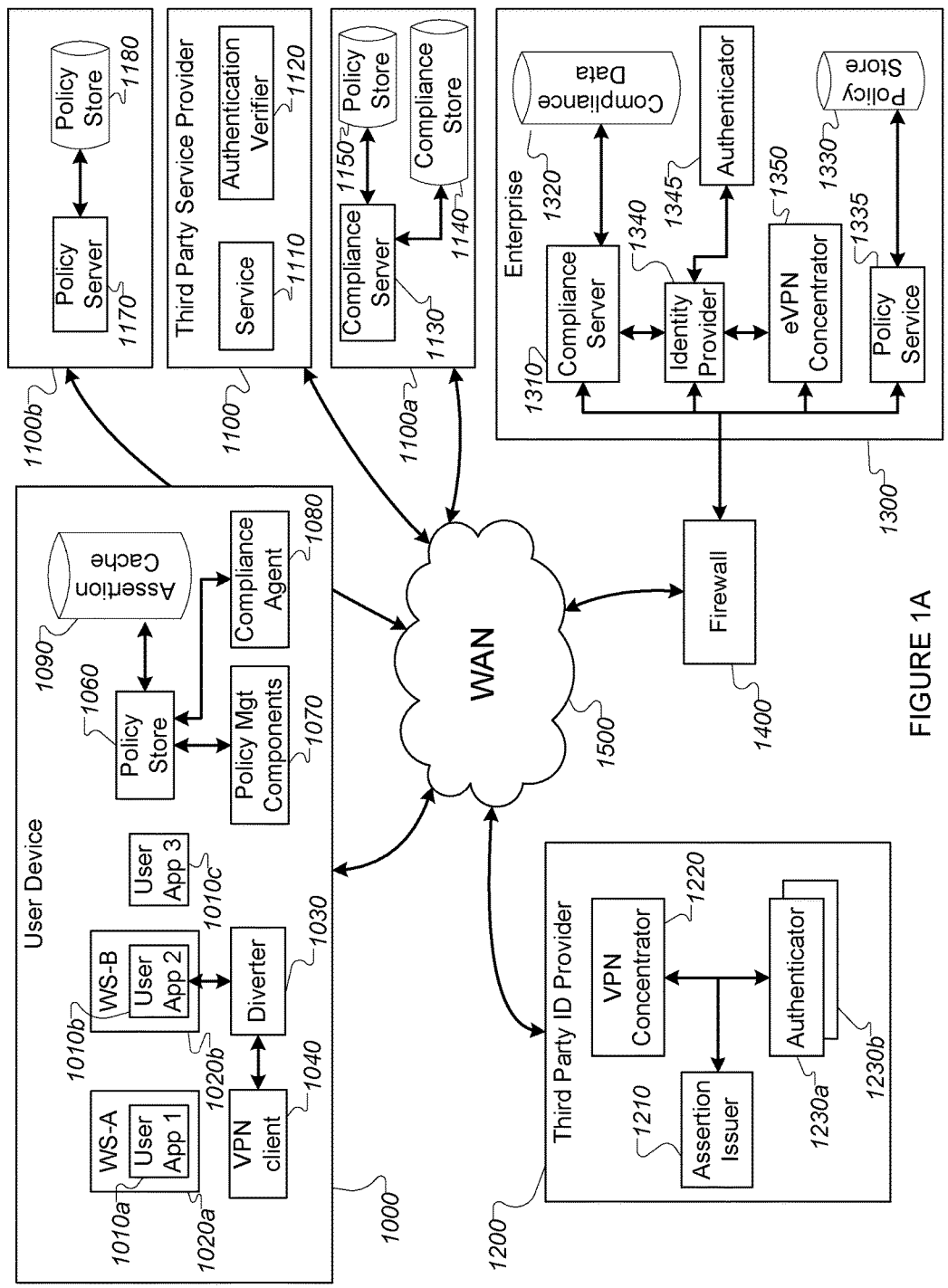
FIG. 1A depicts an exemplary schematic diagram of a system used by an embodiment of the disclosed authentication interaction system of the invention.

FIG. 1A depicts an exemplary systems diagram of some of the objects involved in authentication interaction(s) described herein. The system utilizes one or more user devices (1000), each user device further comprising the following components: one or more user applications (or "apps", 1010a, 1010b, and 1010c), either within a workspace (1020a, 1020b) or outside of a workspace (1010c). Each workspace (1020a, 1020b) may comprise one or more user applications (1010a, 1010b, 1010c). Each user device (1000) can comprise an optional diverter (1030) that intercepts and redirects network traffic, and in particular, DNS queries; and a virtual private network (VPN) client (1040) that permits the user device to communicate over a network link through a VPN tunnel (e.g., via WAN 1500) to a VPN concentrator (1220, 1350) at an identity provider (1200, 1340). In some embodiments, at least one workspace functions in accordance with those workspaces described in co-pending U.S. patent application Ser. No. 13/710,261, filed 10 Dec. 2012, which is incorporated herein by reference in its entirety and for all purposes.

The device (1000) further includes a policy store (1060) in communication with a compliance agent (1080), Policy Management Components (1070) and an Assertion Cache (1090). The compliance agent (1080) (a) determines the compliance status of a device; and (b) stores that compliance status on the user device for use by other user device components. Policy Management Components (1080) includes policy management components, e.g., policy service, policy distribution point, policy enforcement point (1070), as described in U.S. patent application Ser. No. 13/957,893, incorporated here by reference in its entirety and for all purposes. The Assertion Cache (1090) stores identity and other assertions on the user device.

The compliance agent may store the collected data elements themselves in a device local store (not shown), or the agent may generate a store of summary information describing the collected information. Alternatively, the compliance agent may make a determination regarding the compliance of the device with respect to one or more policy elements and may store the results of that determination. Alternatively, the compliance agent may generate a cryptographic token as an indication of the collection or decision. The compliance agent may store the collected or generated items locally on the device (in the above mentioned local store or assertion cache 1090), or the agent may transmit the items to a compliance server (such as enterprise compliance server 1310 or third party compliance server 1130) shown in FIG. 1A. Alternatively, the compliance agent (1080) may provide the compliance information in response to an authorized request during the authentication process. In one more particular embodiment, upon request, or periodically, the compliance agent collects and stores information related to the compliance of the user device with those policy elements, as directed by one or more policy elements stored in a local policy store (1060).

Compliance information collected by the compliance agent may include information such as:
- whether the device has been "rooted" or hacked,
- operating environment on the device (e.g., whether the application is running in a workspace),
- the applications running on the device,
- the applications installed upon the device,
- device configuration options,
- the networks a device is connected to,
- the location of the device, and
- the wifi networks that are identifiable by the device.

The system also comprises one or more third party service providers (1100) that provide at least one service (1110) accessible by the user device (e.g., via WAN 1500). The services provided by the service providers are sometimes called Software-as-a-Service ("SaaS"). Examples of third party service providers include commercial services such as Dropbox and Salesforce. Other specialized service providers may be used, including a third party compliance service (1100a), which records and makes assertions regarding a user device's current compliance status, and a third party policy service (1100b) comprising a policy server (1170) capable of supplying policy as required and a policy store (1180) useful for storing one or more policies.

These third party services (1100) generally provide at least one service (1110) that can be accessed by an authenticated user, user device (1000), or user application (1010a, 1010b, 1010c) from a network connection, and at least one authentication verifier (1120) that verifies authentication assertions. When operating in conjunction with third party identity providers, the third party service provider's authentication verifier verifies identity assertions provided by an identity provider. In the specific case of SAML assertions being used to establish identity, the authentication verifier validates the SAML assertion and determines the identity based upon at least one aspect of the SAML assertion.

Other specialized service providers may be utilized, including a third party compliance service (1100a), further comprising a compliance server (1130), which interacts with user devices and requests and records their compliance status in a compliance data store (1140) and optionally issues assertions regarding a user device's current compliance status. The compliance server operates in accordance to one or more policy elements stored in a local policy store (1150). The policy store is populated from an enterprise policy service (1335), a third party policy service (1100b, described below), or other policy source.

The exemplary system further comprises one or more third party identity providers ("IDPs", 1200) that provides identity assurance indicator upon request. Examples of third party identity providers include commercial identity providers such as Facebook, Ping, and Google. A third party identity provider verifies the identity of a user, user device, or application. The third party identity provider comprises at least an assertion issuer (1210), which issues identity assertions (e.g., SAML assertions) or access tickets (e.g., Kerboros tickets) after validating the identity of the requestor. The third party identity provider may further include a VPN concentrator (1220) that is useful at least for enabling VPN tunnel connections from user device's VPN clients (e.g., 1040) where the VPN tunnel authentication is provided to the assertion provider in order to provide an identity assertion without additional authentication by the user device. The third party identity provider provides one or more authenticators (1230a, 1230b) that are capable of receiving and responding to requests for authentication from either the assertion issuer (1210) or the VPN concentrator (1220). Responding to requests for authentication typically involves processes for determining the identity of a requestor, such as requesting a User ID-password combination, receiving and validating a digital certificate, and the like, and then validating this information against trusted authentication sources such as an enterprise's Active Directory system (not shown).

In some embodiments, either or both of the IDP or VPN Concentraor functions as a policy enforcement point as described in co-pending U.S. patent application Ser. No. 13/710,2957,89361, filed 10 Dec. 2012; and U.S. patent application Ser. No. 14/068,825, filed 31 Oct. 2013. Each of these patent application is incorporated herein by reference in its entirety and for all purposes.

The exemplary system further comprises one or more enterprise computing systems (1300), typically represented by the enterprise's data center systems. These data center components may further comprise a compliance service (1310) useful to determine compliance of a user, user device, or application on a user device (1000) with one or more policies drawn from a policy store (1330) by enterprise policy service (1335), and compliance data (1320) used by a compliance service (1310), a network firewall (1400), an identity provider (1340) and authenticator(s) (1345), which are of similar construction to a third party identity provider (1200), or which can comprise additional capabilities, such as the ability to interact with a compliance service (1310) to determine the policy compliance status of an identity requestor before determining what authentication attributes to return; and an enterprise VPN concentrator (1350) useful at least for enabling VPN tunnel connections from user device VPN clients (1040), similar in function to the VPN concentrator (1220) described above for the third party identity provider.

One important aspect of the described system architecture is that the identified services may be provided by third party providers (e.g., third party identity provider 1200 or third party service provider 1100, 1100a, or 1100b) or by the enterprise within their data center without loss of functionality. The choice of which provider to use is made on the basis of a policy distributed to the user device and to the individual services.

Each of these objects communicates with each other by a wide area network (WAN) (1500), such as the Internet. In some scenarios, the WAN can be supplemented or replaced by one or more local area networks ("LANs", not shown).

Figure 1B:
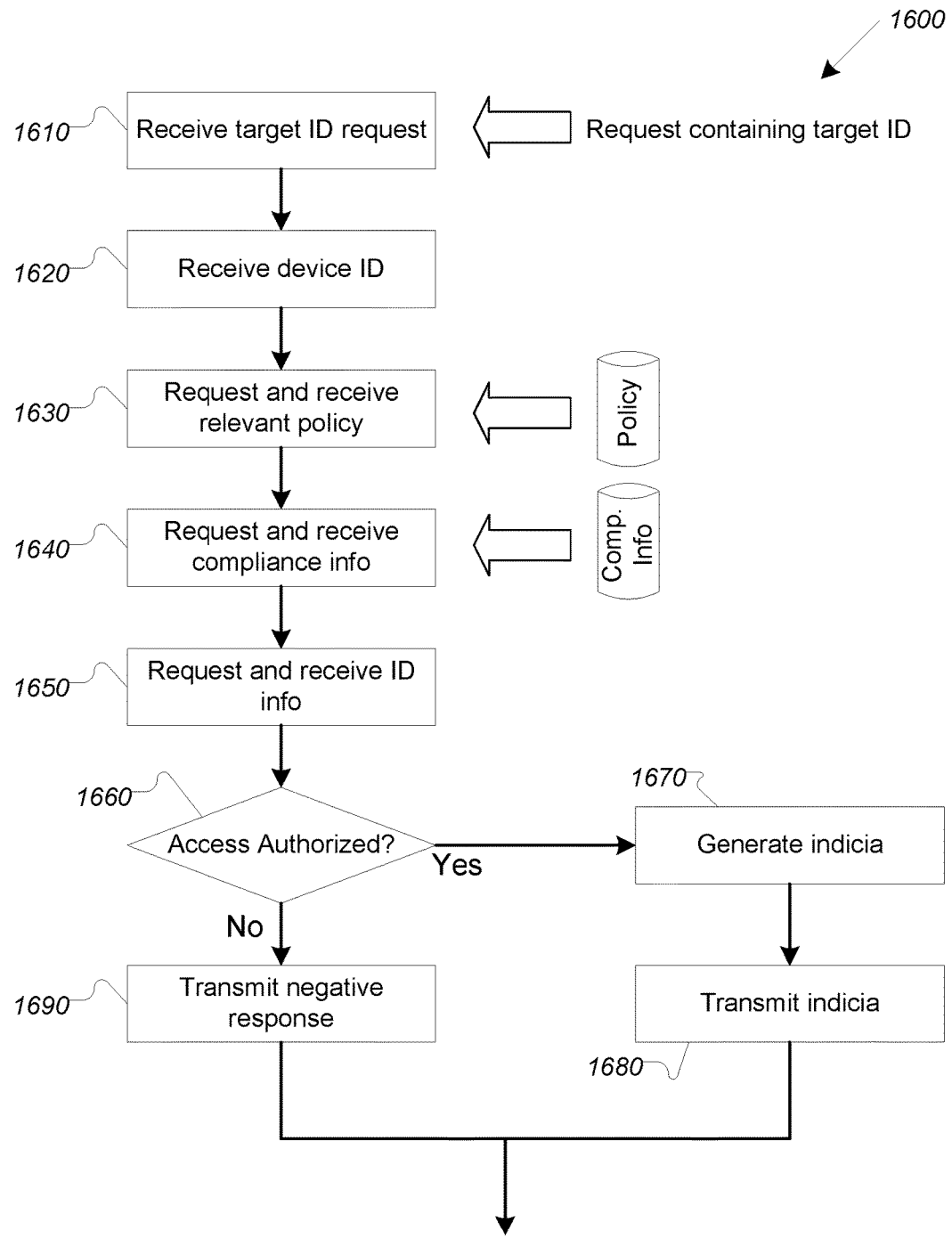
FIG. 1B is a flowchart of an illustrative processing logic of a compliance-enabled identity provider in accordance with an embodiment of the invention.

A compliance-based identity provider operates by collecting information about a user device, assessing that collected information in accordance with one or more policies, and generating a determination as to whether the user device is in compliance with one or more specified policies. The compliance determinations may be integrated into a compliance-based identity provider decision on whether to grant an identity indication in accordance with the process illustrated by the flowchart shown in FIG. 1B at 1600 and described in more detail below.

In step 1610, the identity provider receives a request for access to a specified target. Typically, this target is identified as an enterprise or third party service provided within an enterprise data center or at a third party service provider. The target is typically identified by a unique network name, such as a URI or by a GUID.

In step 1620, the identity provider receives device information about the device, application, or user transmitting the request. This information may include information identifying the device (such as a device ID or a certificate identifying the device), application, or user of the device, such as a certificate, token, cookie, or other identity indicator. In some implementations, the received information may include compliance information from the device.

In step 1630, the identity provider requests and receives from a policy store, policy elements related to the identified target and the identified device. These policy elements may be requested from a local policy store, or from a remote policy store or server such as an enterprise policy server (1335) or a third party policy service (1100b). In some embodiments, the policy is prefetched from the policy store during initialization of the identity provider (and step 1630 becomes a lookup of the prefetched information). These policy elements may include specifications related to time of day access, location of access, required user device specifications, forbidden user device specifications, anti-virus status, and the like.

In step 1640, the identity provider (if not already provided in step 1620) requests and receives device compliance information from a compliance server identified in the policy elements obtained in step 1630. The compliance server may be an enterprise compliance server (1310) or a third party compliance service (1130), or may be provided by the compliance agent of the user device (1080). In some implementations, the compliance information is transmitted by the device to the identity provider as part of the initial request.

In step 1650, the identity provider receives information related to the identity of the principal. For example, the identity provider may be provided with a digital certificate or a user name and password pair. Other identity information may be provided as permitted by policy.

In step 1660, the identity information is validated by the identity provider and a determination made whether the device is currently in compliance with the controlling policy using some or all of the information collected in steps 1610 through 1650. An access decision is reached and the identity provider then issues and transmits to the requesting device an identity indicator (such as a SAML assertion) if the decision is positive (step 1670 and step 1680). In the event the access decision is negative (No branch of step 1670), the identity provider transmits a refusal to issue an indicator (or transmits an invalid or reduced capability indicator) (1590).

The user device then uses the received indicator to access the specified target. In this way, the issuance of an identity indicator is contingent upon the device being in compliance with policy and thus establishes the necessary device context when using third party identity providers and services.

Figure 2A:
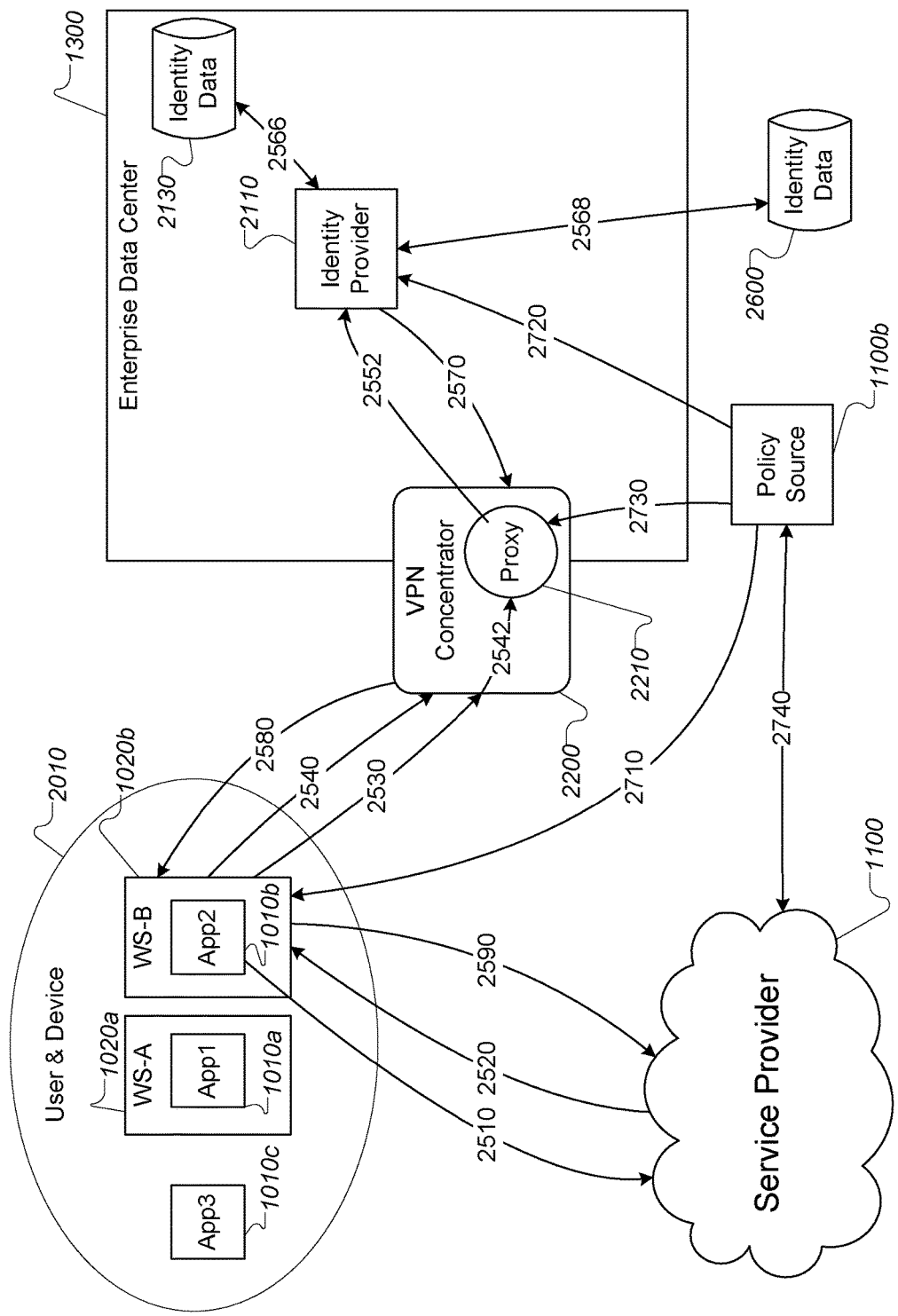
FIG. 2A depicts an exemplary schematic diagram of interactions between objects involved in an authentication interaction with an identity proxy internal to a VPN concentrator in accordance with one embodiment of the invention.

FIG. 2A is a diagram illustrating aspects of a system implementing the components and methods for assuring authentication and compliance of devices accessing external services, including some exemplary paths for authentication and compliance information exchange between the parts of the system in an exemplary non-limiting embodiment.

In this embodiment, the systems and methods join VPN user/device authentication and policy compliance checking with existing authentication protocols. The result is that authorization decisions can be made in a policy context that includes user and device authentication, device and application health and compliance checks, and other policy compliance checks such as access time and location.

In FIG. 2A, the system comprises the principal (2010), i.e. the user and device the service being accessed (1100), the enterprise data center (1300) with the VPN concentrator (2200), identity provider (2110) and its associated enterprise services and data sources (2130), and an external identity provider data source (2600). Also illustrated is an identity proxy internal to the VPN concentrator (2210) useful for altering identity requests to add identity and compliance indications for the identity provider (2110) based on authentication of the principal to the VPN concentrator (2200). In some implementations, the identity proxy is not separable from the VPN concentrator. In other implementations, the identity proxy is a separate component operating in conjunction with (either as a stand-alone component or as part of the identity provider) the VPN concentrator. The system further comprises one or more policy source(s) that can be internal to an enterprise data center (e.g., policy server 1335), external to the enterprise data center (e.g., third party policy service 1100b), or as a combination of policy sources from which policy is aggregated before use (not shown for clarity, described fully in Ser. No. 13/957,893).

In addition to illustrating the various components of an exemplary embodiment of the system, FIG. 2A also illustrates the interactions between the parts of the system (2510-2590 and 2710-2740). These include an application's requesting access to a external service (2510); an external service's requesting authentication from a device (or in alternative embodiments a workspace on the device, or an application on a device) (2520); a device, workspace, or application opening a VPN tunnel (2530) to an identity provider (2110) through a VPN concentrator (2200) (which can involve the VPN concentrator's authenticating the user or device, verifying compliance with required policies, etc.); the authentication request's being sent through the VPN tunnel (2540); interception of the authentication request by an identity proxy (2542); the identity proxy's mediating the authentication request on the basis of one or more policies (e.g., is the principal policy compliant), and if the principal is compliant, forwarding an altered authentication request further comprising assertions of the existing authentication to the VPN and optionally, additional assertions related to principal's policy compliance to an identity provider (2552); the identity provider returning an authentication response (2570) to the principal through the VPN tunnel (2580); and the device, workspace, or application's providing the authentication response to the external service (2590). The identity provider may be connected to and interact with an internal identity data source (2566), or optionally an external identity data source (2568).

In some embodiments, at least one workspace functions in accordance with those workspaces described in co-pending U.S. patent application Ser. No. 13/710,261, filed 10 Dec. 2012, which is incorporated herein by reference in its entirety and for all purposes.

FIG. 2A also illustrates policy interactions between a policy source (1100b), and other parts of the system, such as a device, workspace, or application (2710), an identity provider (2720), an identity proxy (2730), or a service provider (2740). Policy interactions can be unidirectional or bidirectional. In an exemplary non-limiting example, a policy source (e.g., policy server 1100b or policy server 1335) can have a unidirectional interaction with a principal workspace (2710) where it supplies required policy information to the workspace to enable the workspace to function in accordance with required policy, such as specifying identity providers to which requests will be redirected, VPN configuration information, and identity request routing instructions. The policy source can have a bidirectional interaction with a service provider (2740) in which policy-related information is exchanged. In some embodiments, at least one workspace functions in accordance with those workspaces described in co-pending U.S. patent application Ser. No. 13/710,261, filed 10 Dec. 2012, which is incorporated herein by reference in its entirety and for all purposes.

One aspect of this method is coordination between the device, the enterprise VPN concentrator and an identity provider. In an example configuration, a standards-based mechanism such as SAML is used. Unlike standard SAML topologies, the identity provider is accessed through a VPN connection between the device and the identity provider. The VPN may collect and forward some or all of the user ID, device ID, or device compliance/contextual information to the identity provider. On the device, the VPN connection is configured (by initial policy to the device or workspace on the device) such that identity verification and authentication requests forwarded by applications operating on the device are routed such that they traverse a VPN tunnel (either previously established or established upon demand) in order to reach the identity provider. When an application forwards an authentication request from an external service to the identity provider in this way, the enterprise's VPN therefore has knowledge that the request is coming from a previously authenticated principal (device, or user, or application) and is aware of the state of policy compliance of that principal. This knowledge allows the VPN concentrator to authoritatively proxy the authentication request to the identity provider such that the identity provider does not have to do more to authenticate the principal itself. In order to perform this action, the VPN concentrator and the identity provider coordinate the principal's compliance status and previous authentication (to the VPN) status. The only network traffic from the principal that must go through the tunnel is the initial authentication request. Other information exchanges in the process can go through the tunnel, or use other paths. In some embodiments, the identity provider relies upon the VPN validation of ID and compliance status, while in other embodiments, the identity provider does more robust checking of ID and compliance status prior to creating the identity assertion. Specifically, the VPN concentrator may use additional compliance information obtained from a compliance server or a compliance data store, in conjunction with, or in lieu of, compliance information provided by the principal. In the case of an application operating on the device to access a cloud service, all other application traffic can go directly to the cloud service provider from the device without traversing the VPN.

Figure 2B:
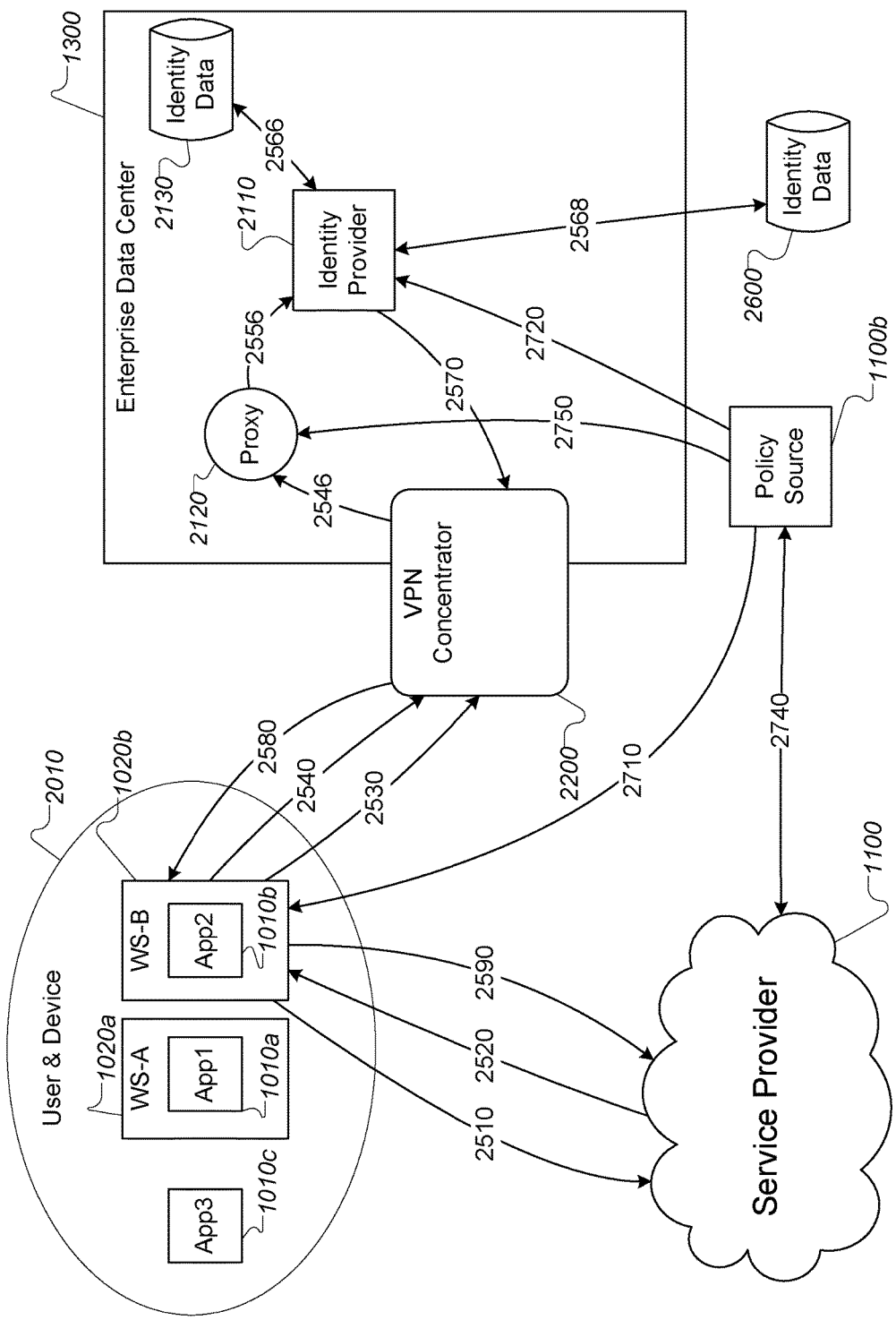
FIG. 2B depicts an exemplary schematic diagram of interactions between objects involved in an authentication interaction with an identity proxy external to a VPN concentrator in accordance with one embodiment of the invention.

FIG. 2B is a diagram illustrating another alternative embodiment of the invention to that shown in FIG. 2A where the identity proxy component (2120) is external to the VPN concentrator (2200). In this alternative arrangement, the identity proxy still has the task of intercepting and modifying authentication requests (2546) before forwarding the request to the identity provider (2556). In this arrangement the identity proxy (2120) can make use of a VPN concentrator API, knowledge of VPN concentrator data storage, or other means to acquire information on the state of the VPN connection with the principal (including any policy compliance information obtained by the VPN concentrator). In the embodiment illustrated in FIG. 2B, the policy source (e.g., 1335 or 1100b) supplies policy to the identity proxy (2750). Other details of FIG. 2B are as described for FIG. 2A.

FIG. 2C is a diagram illustrating another alternative embodiment of the invention to that shown in FIG. 2A where an identity data proxy (2140) is included between the identity provider (2110) and at least some sources of identity data (2130 and 2600). Requests for identity data (2562) are intercepted or routed through the identity data proxy (2562), where policy supplied by a policy source (2750) is used to control how such requests are processed. The identity data proxy (2140) can acquire data from any available source of identity data, whether internal (2564) or external (2565) to the enterprise data center (1300) as specified or permitted by policy. In addition, the identity data proxy may query the VPN concentrator (2200) (or its proxy 2210) for information about the authenticated principal, and provide a reply to the identity provider on the basis of the previous authentication. For example, if a principal has previously authenticated to the VPN concentrator, the identity proxy (2140) may request that information (connection 2590) and then use the previous authentication information to respond to the identity provider without actually querying identity data (2130 or 2600). This, in effect, bypasses the check normally made by the identity provider and permits the identity provider to issue its identity assertion based upon the previous authentication of the principal to the VPN concentrator. Other details of FIG. 2C are as described for FIG. 2A. Note that the alternative arrangement of the identity proxy shown in FIG. 2B (i.e. external to the VPN concentrator) is also compatible with the use of an identity data proxy as shown in FIG. 2C.

FIG. 3 is a flowchart describing the steps taken to carry out the process using SAML authentication with an exemplary embodiment (3000). The exchanges between parts of the system involved are as shown in FIG. 2A, 2B, or 2C. The process starts with a principal attempting to access a service provider prior to authenticating with an identity provider (3010). The service provider responds with a request to the principal for SAML authentication (3020) and redirects the user to the identity provider. The target URI of the identity provider redirection is routed to an identity proxy internal to the VPN concentrator or elsewhere as previously described above. The device then opens a (or uses an already open) VPN tunnel through the enterprise VPN concentrator (3030) to an identity provider (using the identity proxy to mediate the identity request). The redirection of the request to the identity provider causes a VPN tunnel to be created because the VPN client is configured with a destination based rule for the identity provider. In other words, all SAML authentication requests are forwarded down a VPN tunnel in this exemplary embodiment. Opening the VPN tunnel comprises the principal authenticating to the VPN concentrator, and can in some exemplary embodiments also comprise establishing that the device is compliant with required policy. Once the tunnel is established, the device sends the SAML request through the VPN tunnel to the identity provider (3040).

The SAML request is intercepted by a proxy internal to the VPN concentrator, or external to it, depending on the design of the embodiment (as described above). The proxy uses the VPN concentrator's prior authentication of the principal, and optional confirmation of the device's policy compliance, and in some exemplary embodiments, additional information such as current device location, current time, network connectivity, application used, etc., to add additional data to the SAML request (3050) to identify the user, device, workspace, or application and to indicate to the identify provider that prior authentication has been carried out. The specifics of which authentication source to use, the policy compliance source, and specifics of additional information to use are provided by policy elements that are allocated to the VPN concentrator for enforcement. The method of augmentation of the SAML authentication request must be agreed upon by the VPN concentrator or its proxy and the identity provider, and is trusted data for the identity provider. An alternative mechanism for authenticating the user in some exemplary embodiments can involve the SAML request's being sent directly to the identity provider unmodified, and the identity provider's querying the VPN concentrator or its proxy using the source address of the connection to determine the authenticated identity of the principal.

The identity proxy then forwards the modified SAML request to the identity provider (3060). In some exemplary embodiments, the identity provider is configured only to accept authentication requests from known identity proxies. The identity provider then looks up the principal using the data added by the identity proxy to determine whether to authorize access to the requested service provider. The identity provider can access any identity data required, whether internal to the enterprise or external to it, or both, to create a SAML assertion for the response (3070). Access to identity data can be direct, or can be mediated by a proxy. Proxy mediation can, in various embodiments, involve redirection of data requests, modification of data, generation of new data, caching of data, conversion of single data requests into a plurality of data requests, merging of multiple data responses into fewer data responses, or any combination of these or other operations as determined to be proper by those with skill in the art. The SAML response is then returned through the VPN tunnel to the device (3080). The SAML response is then forwarded to the service (3090), and the service grants the principal access determined from the SAML assertion contained in the SAML response (3100), which completes the process (3110). At this point the user/device pair is signed on to the service provider. Further interaction between the app and service provider can occur directly without using the VPN tunnel.

A benefit of this method is that on a device where diverse applications are accessing various services, completion of the process for one application (e.g., a web browser) establishes authentication for the principal, and no additional authentication interaction is needed with the user for additional applications on the same device. Because of the policy limited nature of this benefit, restrictions upon credentials may be applied at user, device, application, or workspace levels. The reuse of credentials may be similarly limited in scope, so that in some example embodiments, the use of previously obtained credentials may be limited to a specific application, set of applications, workspace, or device.

This method works with both device level VPN and per-app level VPN connections. An advantage of the per-app VPN method is that apps not configured to use the enterprise VPN (e.g., personal apps) do not have access to enterprise cloud services even though those services are accessed directly over the Internet. This control happens without the service's implementing any protective mechanisms, such as IP source address restrictions, which would require tunneling enterprise app traffic through the enterprise. Even if the device does not support per-app VPN but the VPN concentrator has app information (e.g., from an interaction with a device API or service), the identity provider can make an authorization decision based on the application and device/user combination.

A way to redirect SAML request traffic to a desired SAML identity provider through a VPN tunnel without requiring modifications to the app or the service provider requesting the authentication is useful in implementing the above methods. Only SAML request traffic needs to be redirected; other traffic need not be directed through the VPN tunnel, though this is possible where desired. Such diversion can be accomplished by intercepting and altering or substituting Domain Name System (DNS) requests or responses that are made to find the address of the SAML identity provider. By supplying a network address that is routed through a VPN tunnel when a DNS request for a SAML provider is intercepted, SAML requests can be diverted through the VPN tunnel. Such diversion can be done on an app-by-app basis, for all SAML requests by a device, or otherwise as required by policy.

Implementation of the DNS redirection described above can be done as shown in FIG. 4, which shows the user device (1000), user application (UA) (1010) running on the user device, third party service provider service (SP) (1100) and a third party SAML identity provider (IP) (1200) further comprising at least one Authenticator (1210) that verifies the user application identity and then provides certification for the service provider that the user, user device, and user application are as claimed. For DNS redirection, the user device further comprises additional components, such as a "diverter" (1030), and VPN client (1040), and at the redirected DNS's destination, a VPN concentrator (1220). The diverter monitors the packet traffic stream between the user application and the network, and diverts network traffic packets identified by policy to alternate paths. In some implementations, the diverter is implemented as part of low level routing capability of the user device.

FIG. 5 shows the interactions between these components, beginning with the user application's requesting access to a resource of the service provider (5010). The service provider responds with a request for SAML authentication by redirecting the user application to the identity provider (5020), and the user application requests DNS translation of the IP address so it can contact the identity provider (5030). However, in this scenario the DNS translation request is intercepted by the diverter (1030), which provides an address for the identity provider (5040) that will route through the VPN tunnel that has been set up between the User VPN client (1020) and the identity provider VPN concentrator (1220). The user application receives the address and makes the SAML request (5050), which is sent to the identity provider through the VPN tunnel (5052). The identity provider VPN concentrator receives the request and delivers it to the identity provider's Authenticator (5057). The identity provider Authenticator authenticates the user application (5060) based at least in part on the VPN server's prior authentication of the user or device (possibly including policy compliance verification) when the VPN connection was established, and sends back a SAML assertion to the user application (5070), which sends it to the service provider (5080), and gains access to the service (5090). Only authentication request traffic is redirected through the VPN tunnel in this process. Other traffic, such as delivery of the SAML authentication certification and access to the SP resource, is allowed to go through without redirection by the diverter in at least some embodiments. In alternative embodiments all traffic from the device can be redirected through the VPN tunnel, for example to implement policy restrictions on data transfer to or from the user application.

FIG. 6 shows an alternate embodiment where the VPN server the user device is connected to is not necessarily associated with the identity provider directly. The user device (1000), user application (1010), identity provider (1200), and Service provider (1100) and identity provider VPN concentrator (1220) operate as described above, The alterative embodiment demonstrates an "Enterprise" (1300) with its own enterprise identity provider (eIP) (1340), which comprises an Authenticator service (not shown in FIG. 6, 1345 in FIG. 1), an Enterprise VPN concentrator (eVPN) (1350). The enterprise may utilize either internally hosted policy services/policy stores (1335/1330 in FIG. 1), or third party policy services and compliance services (1100*b* and 1100*c* in FIG. 1) without deviating from the scope of the invention.

As before, in FIG. 6, when the user application requests access to a resource of the service provider, the service provider responds with a request for SAML authentication by redirecting the user application to an identity provider, and the user application requests DNS translation of the identify provider address so it can contact the identity provider. Also as before, the DNS translation request is intercepted by the diverter (1030), which provides the address of the eIP (1340). The user application receives the address of the eIP and makes the SAML request, which is sent to the eIP through the eVPN tunnel due to the routing of the address used. The eVPN concentrator receives the request and delivers it to the eIP. The eIP Authenticator authenticates the user application based at least in part on the eVPN concentrator's prior authentication of the user or device when the eVPN connection was established, and sends back a SAML certification to the user application, which sends it to the service provider, and gains access to the service.

Redirecting the SAML request to a different identity provider than was requested by the service provider requires that the identity provider that provides the authentication be trusted by the SP. Since a user may make use of a number of service providers, some of which trust the eIP and some of which do not, the request routing needs to be different depending on which identity provider the SAML request was to be sent to. In some embodiments the Diverter (1030) can be provided with this information and provide DNS responses accordingly. In other embodiments the appropriate routing is handled by the eVPN (1350) or the eIP (1340). For example, when the SAML request arrives at the eVPN concentrator (1350), it can look up the service provider in a database or table, and determine whether to send the request to the eIP (1340), or to another identity provider. Where the decision is left to the eIP it can either handle the request, or when the service provider does not trust the eIP, the eIP forwards the request to an identity provider that is trusted after authenticating the user application based on the eVPN connection's prior authentication (and possibly policy compliance check). In this case the identity provider trusts the eIP to have authenticated requests already, and simply "rubber stamps" any requests received through the eVPN/VPN server tunnel and sends them back, whereupon they are forwarded back to the user application for transfer to the service provider to gain access to the requested resource.

In an alternative embodiment, as illustrated in FIG. 7, a user application on a user device (1000) requests access to a third party service (1110). The third party service refers the application to a third party identity provider (1200*a*) in order to obtain an identity indicator (e.g., a SAML assertion) that permits access/use of the third party service. The application contacts the third party identity provider and provides identity information. The third party identity provider (1200*a*) is configured to require identity indicator from a compliance-based Identity Provider (1200*b*), so it refers the application to the compliance-based identity provider in order to obtain the required identity indicator. Use of the compliance-based identity provider indicator permit the third party identity provider to issue a second identity indicator for access to the third party service (e.g., the third party identity provider is the target of the request). Depending upon the particular embodiment, the referral connection to the compliance-based identity provider may be made directly using a secured or unsecured connection, or may be made over a VPN (as described above). The compliance-based identity provider behaves as described above in FIG. 1A, and produces identity indicator for the device/application/user combination in order to permit access to the third party identity provider. This identity indicator is stored by the user device. The user device then returns to the third party identity provider and produces the identity indicator provided by the enterprise compliance-based identity provider, where it is then consumed by the third party identity provider. The third party identity provider then provides (assuming the identity information is correct) an identity indicator suitable to use with the third party service. The absence of the identity indicator provided by the compliance-based identity provider prevents the user device from accessing the third party identity provider, which in turn prevents the device from obtaining an identity indicator to access the third party service. The role of the compliance-based identity provider may be performed by any identity provider that is able to perform the steps shown in FIG. 1A.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g., SSO to service providers), those skilled in the art will recognize that its usefulness is not limited thereto and that the present invention can be beneficially utilized in any number of environments and implementations where it is desirable to use an authentication from a first interaction to authenticate a second, third, or other interaction. Accordingly, the claims set forth below should be construed in view of the full breadth and spirit of the invention as disclosed herein.

7 MACHINE IMPLEMENTATION

As will be apparent to those having ordinary skill in the art, the present invention is implemented in digital electronic circuitry, or in computer hardware, firmware, software, or in combinations thereof. Software of the invention can be implemented in a computer program product tangibly embodied in a machine-readable storage (i.e., non-transitory) device for execution by a programmable processor; and method steps of the invention can be performed by a programmable processor executing a program of instructions to perform functions of the invention by operating on input data and generating output in the form of data structures encoded in memory devices and transformed using a processor that manipulates data in the form of signals retrieved from the memory and returns a transformed data structure in computer memory.

More particularly, as will be apparent to those having skill in the art, that while the disclosure herein refers to such terms as "compartments", "policies", and "policy management points", these refer to electronic computer data structures and instructions that are stored as signals in memory devices controlled, accessed, and executed by electronic computers in order to control the state of computer electronic data and instructions stored in computer-accessible memory, or the movement of electronic computer data and instructions among two or more computers as described herein. Often such operations occur without direct human interaction or even the knowledge of the users of the computers using the various aspects of the present invention.

The invention can be implemented advantageously in one or more computer programs that are executable on programmable systems including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; the language can be a compiled or interpreted language. Suitable processors include, by way of example, both general and special purpose microprocessors. Generally, a processor will receive instructions and data from a read-only memory or a random access memory or a combination thereof. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi conductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users. Finally, the processor can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, can be received from and output to the network, for example, in the form of a computer data signal embodied in a carrier wave.

The above-described devices and materials will be familiar to those of skill in the computer hardware and software arts. It should be noted that the present invention employs various computer implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities. The present invention also relates to devices, systems or apparatus for performing the aforementioned operations. The system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings herein, or, alternatively, it can be more convenient to construct a more specialized computer system to perform the required operations.

Thus, those having ordinary skill in the art will appreciate that the present invention meets the needs described above and possesses still more useful aspects and applications. A number of implementations of the invention have been described. Nevertheless, it will be understood that various modifications can be made without departing from the spirit and scope of the invention. Accordingly, other embodiments are within the scope of the description herein.

What is claimed:

1. A system for providing a compliance-based identity for determining whether an electronic computing device complies with the security policy for an electronic communications and data network of electronic computer devices, such determination including the context of said electronic computing device, comprising:
an identity provider comprising a memory storing computer readable instructions, and a microprocessor for executing the instructions,
said identity provider configured to:
receive an electronic request signal from said electronic computing device and establish a virtual private network (VPN) connection with said electronic computing device and a VPN concentrator, said electronic request signal including an electronically encoded request to allow an electronically encoded process operating on an electronic processor of said electronic computer device to establish electronic communication with a specific target electronic device or service operating on said electronic communications and data network;
receive at said VPN concentrator intercepted and redirected messages from said electronic computing device;
receive from said electronic computing device electronically encoded information about the identity of said electronically encoded process, said electronic computing device, or the user of said electronic computing device;
receive from a policy store electronically encoded policy elements defined by said security policy; receive from a compliance server electronically encoded information about the compliance of said electronic computing device with respect to said security policy;
receive from said VPN concentrator electronically encoded information related to the identity of the principal of said electronic computing device; and
determine at said identity provider whether said electronic computing device complies with said security policy using said request, said identity, said compliance, and said principal identity information, and said policy elements.

2. The system of claim 1, wherein said intercepted and redirected messages include Domain Name System (DNS) queries.

3. The system of claim 2, wherein said identity provider includes a diverter to intercept and redirect said selected messages.

4. The system of claim 3, wherein said diverter sends and receives said selected messages to and from a VPN client.

5. The system of claim 4, wherein said VPN client is connected to a VPN tunnel, said identity provider is a Security Assertion Markup Language (SAML) identity provider, and said diverter intercepts and alters, or substitutes, DNS requests or responses that are made to find the address of said SAML identity provider to thereby divert said requests to said VPN tunnel.

6. The system of claim 5, wherein said SAML requests are processed by said diverter on an app-by-app basis, for all SAML requests, or as defined by policy.

7. The system of claim 6, wherein said diverter is implemented as a component of the low-level routing capability of said device.

8. The system of claim 6, wherein said diverter diverts only authentication traffic, and the delivery of SAML authentication certification and access to service provider resources, is not redirected by said diverter.

9. The system of claim 6, wherein said diverting packets includes redirecting all traffic through said VPN tunnel.

10. The system of claim 5, wherein said diverter redirects a SAML request to said identity provider through an enterprise VPN concentrator.

11. The system of claim 10, wherein said enterprise identity provider authenticates said user, said authentication being based at least in part one said enterprise VPN concentor's prior authorization of said user.

12. The system of claim 5, wherein said diverter intercepts and redirects a SAML authentication request through said VPN tunnel to a VPN concentrator that forwards said request to said identity providers authenticator, said authenticator determines said SAML authentication request using said VPN server's prior authentication of said user or said device, and said authenticator sends a SAML assertion to a user application to enable said user application to access a service controlled by said authenticator.

13. The system of claim 5, wherein said diverter redirects only authentication traffic through said VPN tunnel.

14. The system of claim 5, wherein said diverter redirects all traffic through said VPN tunnel.

15. The system of claim 5, wherein said diverter redirects SAML requests to an identity provider to an enterprise identity provider through an enterprise VPN concentrator, and said enterprise identity provider authenticates said user based at least in part on said enterprise VPN concentrator's prior authorization of said user.

16. The system of claim 5, wherein said diverter redirects a subsequent SAML request to an different identity provider from the initial identity provider to which the first SAML request was sent, wherein said different identity provider is trusted by said service provider.

17. The system of claim 5, wherein said diverter handles said SAML request.

18. The system of claim 5, wherein said enterprise VPN or said enterprise identity provider handles said SAML request.

19. The system of claim 18, wherein said enterprise VPN handles said SAML request.

20. The system of claim 19, wherein said enterprise VPN looks up said service provider in a database or table and determines whether to send the request to the enterprise identity provider or to another trusted service provider.

21. The system of claim 5, wherein said identity provider to which said request is forwarded trusts said enterprise identity provider to have authenticated said request already, and rubber stamps all requests received through said enterprise VPN/VPN tunnel.

22. The system of claim 3, further including monitoring packet traffic stream between a user application and said network using said diverter, and diverting packets identified by policy to at least one alternative path.

23. The system of claim 1, wherein said enterprise identity provider forwards said request to a second trusted service provider if a first service provider is not trusted.

24. The system of claim 1, wherein said enterprise identity provider authenticates said user application based on said enterprise VPN authentication.

25. A method for determining whether an electronic computing device complies with the security policy for an electronic communications and data network of electronic computer devices, such determination including the context of said electronic computing device, said method comprising:
- establishing a virtual private network (VPN) connection with said electronic computing device, an identity provider, and a VPN concentrator;
- receiving at said VPN concentrator intercepted and redirected messages from said electronic computing device;
- receiving over from said electronic computing device said VPN connection an electronic request signal, said electronic request signal including an electronically encoded request to allow an electronically encoded process operating on an electronic processor of said electronic computer device to establish electronic communication with a specific target electronic device or service operating on said electronic communications and data network;
- receiving from said electronic computing device electronically encoded information about the identity of said electronically encoded process, said electronic computing device, or the user of said electronic computing device;
- receiving from a policy store electronically encoded policy elements for said security policy;
- receiving from a compliance server electronically encoded information about the compliance of said electronic computing device with respect to said security policy;
- receiving from said VPN connection electronically encoded information related to the identity of the principal of said electronic computing device; and
- determining at said identity provider whether said electronic computing device complies with said security policy using said request, said identity, said compliance, and said principal identity information, and said policy elements.

26. The method of claim 25, wherein said intercepted and redirected messages include Domain Name System (DNS) queries.

27. The method of claim 26, wherein said identity provider includes a diverter to intercept and redirect said selected messages.

28. The method of claim 27, wherein said diverter sends and receives said selected messages to and from a VPN client.

29. The method of claim 28, wherein said VPN client is connected to a VPN tunnel, said identity provider is a Security Assertion Markup Language (SAML) identity provider, and said diverter intercepts and alters, or substitutes, DNS requests or responses that are made to find the address of said SAML identity provider to thereby divert said requests to said VPN tunnel.

30. The method of claim 29, wherein said SAML requests are processed by said diverter on an app-by-app basis, for all SAML requests, or as defined by policy.

31. The method of claim 30, further including monitoring packet traffic stream between a user application and said network using said diverter, and diverting packets identified by policy to at least one alternative path.

32. The method of claim 30, wherein said diverter is implemented as a component of the low-level routing capability of said device.

33. The method of claim 30, wherein said diverter diverts only authentication traffic, and the delivery of SAML authentication certification and access to service provider resources, is not redirected by said diverter.

34. The method of claim 30, wherein said diverting packets includes redirecting all traffic through said VPN tunnel.

35. The method of claim 29, wherein said diverter redirects a SAML request to said identity provider through an enterprise VPN concentrator.

36. The method of claim 35, wherein said enterprise identity provider authenticates said user, said authentication being based at least in part on said enterprise VPN concentrator's prior authorization of said user.

37. The method of claim 29, wherein said diverter intercepts and redirects a SAML authentication request through said VPN tunnel to a VPN concentrator that forwards said request to said identity providers authenticator, said authenticator determines said SAML authentication request using said VPN server's prior authentication of said user or said device, and said authenticator sends a SAML assertion to a user application to enable said user application to access a service controlled by said authenticator.

38. The method of claim 29, wherein said diverter redirects only authentication traffic through said VPN tunnel.

39. The method of claim 29, wherein said diverter redirects all traffic through said VPN tunnel.

40. The method of claim 29, wherein said diverter redirects SAML requests to an identity provider to an enterprise identity provider through an enterprise VPN concentrator, and said enterprise identity provider authenticates said user based at least in part on said enterprise VPN concentrator's prior authorization of said user.

41. The method of claim 29, wherein said diverter redirects a subsequent SAML request to an different identity provider from the initial identity provider to which the first SAML request was sent, wherein said different identity provider is trusted by said service provider.

42. The method of claim 29, wherein said diverter handles said SAML request.

43. The method of claim 29, wherein said enterprise VPN or said enterprise identity provider handles said SAML request.

44. The method of claim 43, wherein said enterprise VPN handles said SAML request.

45. The method of claim 44 wherein said enterprise VPN looks up said service provider in a database or table and determines whether to send the request to the enterprise identity provider or to another trusted service provider.

46. The method of claim 29, wherein said identity provider to which said request is forwarded trusts said enterprise identity provider to have authenticated said request already, and rubber stamps all requests received through said enterprise VPN/VPN tunnel.

47. The method of claim 25, wherein said enterprise identity provider forwards said request to a second trusted service provider if a first service provider is not trusted.

48. The method of claim 25, wherein said enterprise identity provider authenticates said user application based on said enterprise VPN authentication.

49. A non-transitory computer-readable medium, containing electronically encoded computer readable program control devices thereon, said electronically encoded computer readable program control devices being configured to enable an electronic computer to perform electronic computer operations comprising:

establishing a virtual private network (VPN) connection with said electronic computing device, an identity provider, and a VPN concentrator;

receiving at said VPN concentrator intercepted and redirected messages from said electronic computing device;

receiving over from said electronic computing device said VPN connection an electronic request signal, said electronic request signal including an electronically encoded request to allow an electronically encoded process operating on an electronic processor of said electronic computer device to establish electronic communication with a specific target electronic device or service operating on said electronic communications and data network;

receiving from said electronic computing device electronically encoded information about the identity of said electronically encoded process, said electronic computing device, or the user of said electronic computing device;

receiving from a policy store electronically encoded policy elements for said security policy;

receiving from a compliance server electronically encoded information about the compliance of said electronic computing device with respect to said security policy;

receiving from said VPN connection electronically encoded information related to the identity of the principal of said electronic computing device; and determining at said identity provider whether said electronic computing device complies with said security policy using said request, said identity, said compliance, and said principal identity information, and said policy elements.

50. The non-transitory computer-readable medium of claim 49, wherein said selected messages include Domain Name System (DNS) queries.

51. The non-transitory computer-readable medium of claim 50, wherein said identity provider includes a diverter to intercept and redirect said selected messages.

52. The non-transitory computer-readable medium of claim 51, wherein said diverter sends and receives said selected messages to and from a VPN client.

53. The non-transitory computer readable medium of claim 52, wherein said VPN client is connected to a VPN tunnel, said identity provider is a Security Assertion Markup Language (SAML) identity provider, and said diverter intercepts and alters, or substitutes, DNS requests or responses that are made to find the address of said SAML identity provider to thereby divert said requests to said VPN tunnel.

54. The non-transitory computer-readable medium of claim 53, wherein said SAML requests are processed by said diverter on an app-by-app basis, for all SAML requests, or as defined by policy.

55. The non-transitory computer-readable medium of claim 54, wherein said diverter is implemented as a component of the low-level routing capability of said device.

56. The non-transitory computer-readable medium of claim 54, wherein said diverter diverts only authentication traffic, and the delivery of SAML authentication certification and access to service provider resources, is not redirected by said diverter.

57. The non-transitory computer-readable medium of claim 56, wherein said enterprise VPN handles said SAML request.

58. The non-transitory computer-readable medium of claim 54, wherein said diverting packets includes redirecting all traffic through said VPN tunnel.

59. The non-transitory computer-readable medium of claim 58, wherein said enterprise VPN looks up said service provider in a database or table and determines whether to send the request to the enterprise identity provider or to another trusted service provider.

60. The non-transitory computer-readable medium of claim 53, wherein said diverter redirects a SAML request to said identity provider through an enterprise VPN concentrator.

61. The non-transitory computer-readable medium of claim 53, wherein said diverter intercepts and redirects a SAML authentication request through said VPN tunnel to a VPN concentrator that forwards said request to said identity providers authenticator, said authenticator determines said SAML authentication request using said VPN server's prior authentication of said user or said device, and said authenticator sends a SAML assertion to a user application to enable said user application to access a service controlled by said authenticator.

62. The non-transitory computer-readable medium of claim 53, wherein said diverter redirects only authentication traffic through said VPN tunnel.

63. The non-transitory computer-readable medium of claim 53, wherein said diverter redirects all traffic through said VPN tunnel.

64. The non-transitory computer-readable medium of claim 53, wherein said diverter redirects SAML requests to an identity provider to an enterprise identity provider through an enterprise VPN concentrator, and said enterprise identity provider authenticates said user based at least in part on said enterprise VPN concentrator's prior authorization of said user.

65. The non-transitory computer-readable medium of claim 53, wherein said diverter redirects a subsequent SAML request to an different identity provider from the initial identity provider to which the first SAML request was sent, wherein said different identity provider is trusted by said service provider.

66. The non-transitory computer-readable medium of claim 53, wherein said diverter handles said SAML request.

67. The non-transitory computer-readable medium of claim 53, wherein said enterprise VPN or said enterprise identity provider handles said SAML request.

68. The non-transitory computer-readable medium of claim 53, wherein said identity provider to which said request is forwarded trusts said enterprise identity provider to have authenticated said request already, and rubber stamps all requests received through said enterprise VPN/VPN tunnel.

69. The non-transitory computer-readable medium of claim 51, further including monitoring packet traffic stream between a user application and said network using said diverter, and diverting packets identified by policy to at least one alternative path.

70. The non-transitory computer-readable medium of claim 49, wherein said enterprisel identity provider authenticates said user, said authentication being based at least in part one said enterprise VPN concentor's prior authorization of said user.

71. The non-transitory computer-readable medium of claim 49, wherein said enterprise identity provider forwards said request to a second trusted service provider if a first service provider is not trusted.

72. The non-transitory computer-readable medium of claim 49, wherein said enterprise identity provider authenticates said user application based on said enterprise VPN authentication.

* * * * *

UNITED STATES PATENT AND TRADEMARK OFFICE
CERTIFICATE OF CORRECTION

PATENT NO.         : 10,185,963 B2
APPLICATION NO.    : 15/494620
DATED              : January 22, 2019
INVENTOR(S)        : David Goldschlag et al.

Page 1 of 1

It is certified that error appears in the above-identified patent and that said Letters Patent is hereby corrected as shown below:

Column 19, Line 16 (Claim 1): Replace "determining whetheran electronic computing device" with --determining whether an electronic computing device--

Column 24, Line 62 (Claim 70): Replace "said enterprisel identity" with --said enterprise identity--

Signed and Sealed this
Nineteenth Day of November, 2019

Andrei Iancu
*Director of the United States Patent and Trademark Office*